United States Patent [19]

Cain

[11] 4,355,784
[45] Oct. 26, 1982

[54] METHOD AND APPARATUS FOR CONTROLLING BACK PRESSURE

[75] Inventor: Lester L. Cain, Houston, Tex.

[73] Assignee: Warren Automatic Tool Company, Houston, Tex.

[21] Appl. No.: 174,826

[22] Filed: Aug. 4, 1980

[51] Int. Cl.³ .......................................... F16K 31/122
[52] U.S. Cl. ............................. 251/63; 137/329.01; 137/329.03; 137/329.06; 137/509; 175/38; 251/121; 251/210
[58] Field of Search .................. 137/509; 175/38; 251/63, 121, 210

[56] References Cited

U.S. PATENT DOCUMENTS

| | | | |
|---|---|---|---|
| 1,094,267 | 4/1914 | Sullivan | 137/516 |
| 2,891,570 | 6/1959 | Krupp | 137/509 |
| 2,962,045 | 11/1960 | Christensen | 137/509 |
| 2,989,971 | 6/1961 | Valentine | 137/102 |
| 3,026,896 | 3/1962 | Bosworth | 251/63 X |
| 3,054,422 | 9/1962 | Napolitano | 137/509 |
| 3,059,894 | 10/1962 | Knecht | 251/210 X |
| 3,443,643 | 5/1969 | Jones | 175/25 |
| 3,470,972 | 10/1969 | Dower | 175/25 |
| 3,778,022 | 12/1973 | Yauneridge | 251/14 |
| 3,955,796 | 5/1976 | Grove | 251/172 |
| 4,044,834 | 8/1977 | Perkins | 166/314 |
| 4,167,262 | 9/1979 | Lemmon | 251/25 |
| 4,190,073 | 2/1980 | Claycomb | 251/63 X |
| 4,257,442 | 3/1981 | Claycomb | 251/63 X |

FOREIGN PATENT DOCUMENTS 1241221 5/1967 Fed. Rep. of Germany .
506719 5/1976 U.S.S.R. .

*Primary Examiner*—Robert G. Nilson
*Attorney, Agent, or Firm*—Arnold, White & Durkee

[57] ABSTRACT

A back pressure control choke operates to automatically control and maintain a desired back pressure on the fluid passing through the choke. The choke housing has an inlet channel which intersects with an axial bore, part of which bore constitutes the discharge channel. An annular choke seat concentrically arranged in the discharge channel of the axial bore is adapted to receive an annular choke element. The choke element is affixed to a shuttle which is mounted on a fixed mandrel extending into the axial bore of the choke housing. The shuttle is dynamically sealed against the housing and mandrel such that a closed chamber is created in that portion of the axial bore opposite the discharge channel. The shuttle element is constructed to be fluid balanced such that it will move to achieve an equilibrium of pressure on its forward and rear surfaces. By introducing a desired pressure in the closed chamber, the shuttle and attached choke element will move and throttle the fluid flowing through the choke to automatically maintain a back pressure equal to the pressure in the closed chamber.

16 Claims, 2 Drawing Figures

METHOD AND APPARATUS FOR CONTROLLING BACK PRESSURE

BACKGROUND OF THE INVENTION

The invention relates to a method and apparatus for controlling back pressure of fluid flowing through a choke device in a system, wherein the coke automatically moves to maintain a desired back pressure on the fluid no matter what flow conditions exist or occur within the system.

During the drilling of oil wells wherein a circulating fluid such as drilling mud is used, it is the practice at times to impose a back pressure on the drilling fluid. The back pressure, together with the hydrostatic pressure of the fluid in the well bore, contain the pressure of fluids within formations penetrated by the well bore and prevent these formation fluids from flowing into the well bore. Back pressure control devices are also necessary for controlling "kicks," which are the intrusion of salt water or formation gases into the drilling fluid which may lead to a blowout condition. In the case of a "kick," sufficient additional back pressure must be imposed on the drilling fluid such that, in combination with the hydrostatic head pressure of the drilling fluid in the bore, the formation fluid is contained and the well controlled until heavier fluid or mud can be circulated down the drill string and up the annulus to kill the well.

It is also desirable to avoid the creation of "excessive" back pressures which could cause drill string to stick, or cause damage to the formation, the well casing, or the well head equipment.

Maintenance of a desired back pressure on the drilling fluid is complicated by variations in the flow characteristics which occur in the drilling fluid passing through the back pressure control device. When flow characteristics of the drilling fluid entering the back pressure control device change, e.g. the density of the fluid is altered by the injection of debris or formation gases, or the volume of fluid entering the control device changes, the desired back pressure will not be achieved until appropriate changes have been made in the throttling of the drilling fluid in response to these changed flow conditions. Conventional devices generally required manual control of and adjustments to the choking device orifice to maintain the desired bottom-hole pressures. However, manual control of the throttling device involves a lag time in making a correction and generally is inexact. Consequently, the art is in need of back pressure control devices which are more automatic and accurate in response.

One approach to overcoming the foregoing described problems may be found in U.S. Pat. No. 3,443,643, issued on May 13, 1969, to Jones. This patent discloses a choke having a "valve" element which carries an annular sleeve adapted to seat within an annular seal ring in a manner which can throttle fluid entering the choke and passing through the annular seal ring. Movement of the þthrottling" annular sleeve and valve element is controlled by fluid pressures acting upon a piston connected to the valve element. Well pressure conditions are monitored through a control device which automatically sends signals controlling pressures on the opposite faces of the "fluid balanced" piston, thereby causing appropriate movement of the valve element and throttling annular sleeve. While this patent discloses an "automatic" system, there is still a problem of lag time between the identification of a change in flow conditions of the fluid entering the choke and the generation of signals from the control monitor to the piston which controls the throttling element.

U.S. Pat. No. 4,044,834, issued Aug. 30, 1977 to Perkins discloses a control valve and system for a well bore designed to control the flow of fluid from the well bore. This reference shows a device which responds to changes in the pressure in the drilling fluid entering the device, but it is not a direct response such that the desired back pressure is truly automatically maintained. When conditions change suddenly such that well bore fluid pressure changes, pressure equalization, that is, the return to the actual desired back pressure, is not immediately obtained. A control system must sense the change which occurred in the well bore pressure and generate a signal to a control piston which then moves the choke to achieve the desired back pressure on the drill fluid.

Other examples of pressure relief or a control devices are shown in U.S. Pat. Nos. 2,962,045, 3,778,022, and 4,167,262. However, none of these devices provide for an automatic response of the choking element to the system fluid such that the desired back pressure is maintained in the system.

SUMMARY OF THE INVENTION

The problems of the conventional choking devices are overcome by the features and advantages of the present invention. The present invention provides a method and apparatus wherein a back pressure control choke operationally responds directly and automatically to changed fluid conditions without the need for control signals. A desired back pressure can therefore be maintained on the fluid despite the changed flow conditions.

In accordance with the invention, the foregoing benefits have been achieved through the present back pressure control choke apparatus. The back pressure control choke of this invention has a housing which includes an inlet channel intersecting with an axial bore through the housing. One end of the axial bore constitutes the discharge channel for the fluid which is passed through the choke. A choke seat member is concentrically mounted and supported within the axial bore in the discharge channel at the intersection of the inlet channel with the axial bore. A mandrel, fixed to the housing, coaxially extends into the axial bore of the housing in that portion of the bore opposite the discharge channel. A shuttle is slideably mounted about the mandrel within the axial bore.

The surface area of the forward axial end of the shuttle which faces the discharge channel is substantially equal to the surface area of the rear axial end of the shuttle. The shuttle is dynamically sealed against the axial bore of the housing and against the mandrel such that a closed chamber is formed by the rear axial end of the shuttle, the mandrel, and the housing, the chamber being in that portion of the axial bore opposite the discharge channel. A choke element is mounted to the forward axial end of the shuttle, concentric with the axial bore. This choke element has an outside cylindrical surface sized for insertion into and withdrawal from the choke seat member thereby to control the fluid flow out the discharge channel.

A means is provided for applying a fluid pressure to the closed chamber and against the surface area of the rear axial end of the shuttle, thereby to control the movement of the substantially balanced shuttle and choke element relative to the choke seat member. Consequently, the back pressure exerted on the fluid passing through the choke is automatically controlled in that the substantially balanced shuttle will respond directly to changed conditions in the fluid flow to maintain equal pressures on its forward and rear surface areas.

A feature of the present invention includes a seal means carried by the shuttle and choke element whereby a positive seal stopping all flow through the housing is achieved when the choke element is fully inserted into the choke seat. A further feature of the present invention resides in the use of a seal having the general shape of a right triangle wherein the right angle sides of the seal are abutted and retained against the shuttle and choke element respectively in a manner such that substantially complete insertion of the choke element into the choke seat causes a positive seal of the leading edge of the choke seat against the hypotenuse side of the generally triangular seal. The formation of this seal from a material such as Teflon, causes the seal to be "self-energizing" in that the Teflon will extrude as needed to maintain a surface area which can seal against the leading edge of the choke seat.

An additional feature of the present invention is that the choke element and choke seat are reversible end-by-end. Yet another feature is the chamfered edges of the choke element and choke seat.

Still another feature of the present invention is the use of an indicator rod slideably extending through the mandrel, with one end of the rod extending outside the housing and the other end being connected to the shuttle for corresponding movement therewith so as to provide an indication of the relative position of the choke element to the choke seat and to monitor the wear of the choke element and choke seat.

A method for automatically controlling the back pressure on a flow of a process fluid through a choke device is also provided. The rear surface area of the slideable shuttle in the choke device is pressurized to a level equal to the back pressure desired on the fluid flow in the system. The fluid flow is directed into the inlet channel, through the choke device and to an outlet channel. A forward surface area of the slideable shuttle, equal to the pressurized rear surface area, is subjected to the fluid flow and the pressure generated therein. Inasmuch as the shuttle is pressure balanced, it will move in the direction of the lower pressure. By affixing a choke element to the slideable shuttle in a manner that movement of the shuttle will cause the choke element to reciprocate in and out of the path of the fluid flow, the pressure on the fluid flow can be directly affected and controlled. The fluid flow is automatically choked by the choke element to create a back pressure on the fluid and on the forward surface area of the shuttle equal to the pressure being exerted on the rear surface area of the shuttle.

Where restricting of the fluid flow is not enough, the generation of a desired back pressure can be achieved by the sealing of the choke element in a choke seat such that a positive cutoff of fluid flow through the choke device occurs. Pressure buildup in the fluid will result until it slightly exceeds the desired level. The shuttle will then be urged away from the fluid and will withdraw the choke element from the sealing arrangement thus permitting flow to resume at the desired back pressure.

The back pressure control choke of the present invention, when compared with prior chokes and regulators, is operationally advantageous in that a desired back pressure on fluid can be automatically maintained without the need for generating any "control" signals. It also permits a positive cutoff of the fluid by virtue of its seal arrangement, with minimal effect on the capacity of the choke to reopen in response to an excessive back pressure on the fluid. Further, the choke of this invention automatically maintains the correct or desired back pressure when the fluid pump, i.e. a rig mud pump, is started up or shut down, thereby eliminating the possibility of pressure surges that always exists during these times with a conventional hydraulically controlled choke. Therefore, the choke of this invention is highly accurate in controlling back pressure at desired pressure values during shutting and opening of fluid flow through the choke, as well as during throttling thereof.

BRIEF DESCRIPTION OF THE DRAWINGS

Additional features and advantages will become apparent from the following detailed description including the following figures where like reference numerals designate like parts in which.

While the invention has been described in connection with a preferred embodiment, it will be understood that it is not intended to limit the invention to that embodiment and many modifications will be apparent to persons skilled in the art.

DETAILED DESCRIPTION OF THE INVENTION

Figure 1:
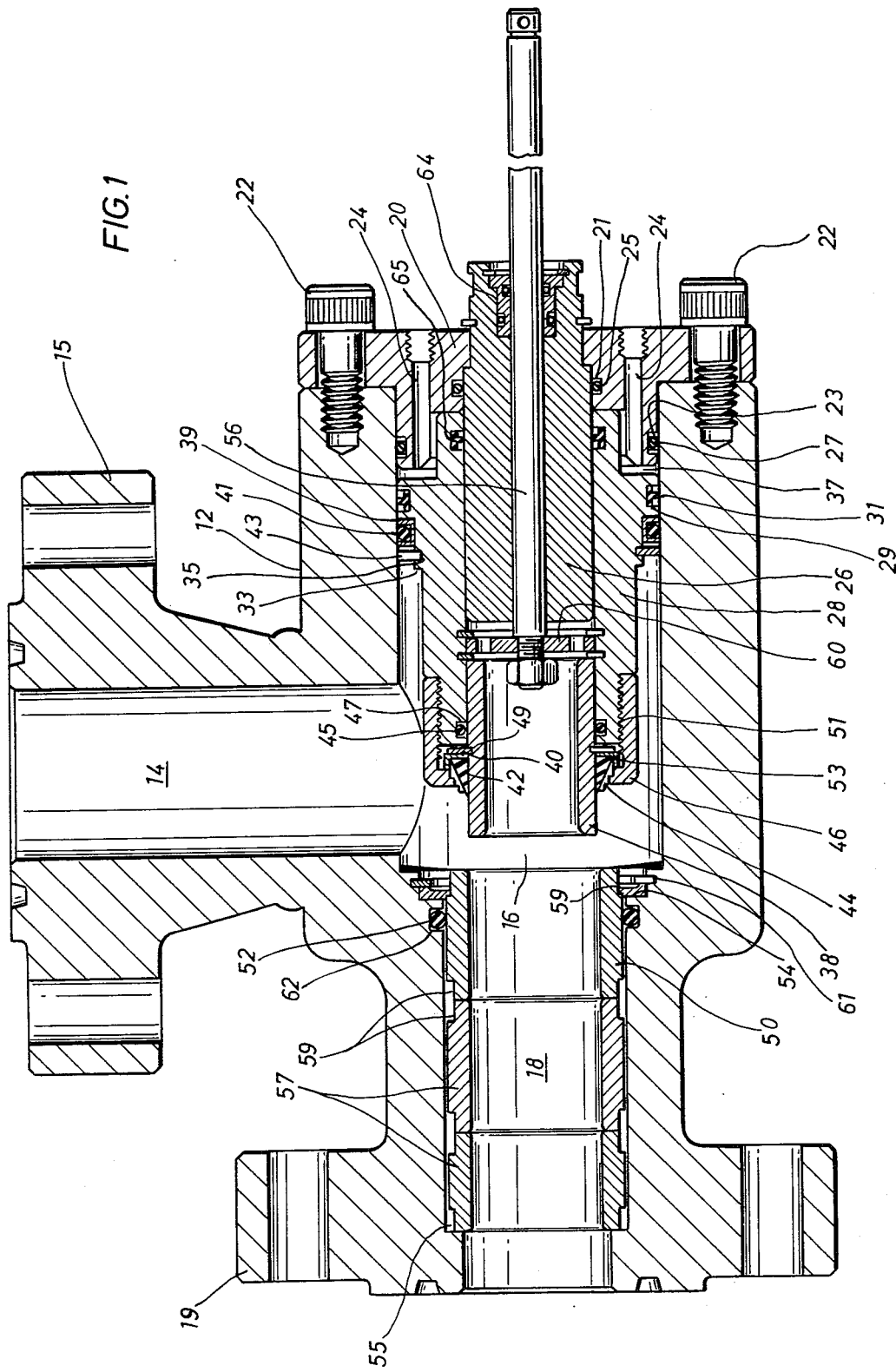
FIG. 1 is a cross sectional view taken through the center of the housing of one embodiment of the invention; and, FIG. 2 is a cross sectional view taken through the center of the housing of the embodiment shown in FIG. 1 wherein the choke element is in a closed position with respect to the choke seat.

In FIG. 1, a cross sectional view of the back pressure control choke 10 of the present invention is shown. The housing 12 for the choke is of a generally T-shaped arrangement which incorporates an inlet channel 14 which intersects and is substantially normal to an axial bore 16. Fluid, such as drilling fluid which is returning from a well after circulation therethrough, would pass through inlet channel 14 to discharge channel 18 which is part of the axial bore 16. The housing may be provided with a flange 15 as a means for connection of the choke to a well fluid return line, while flange 19 may be provided as a means for connecting the choke to a suitable downstream flow line.

As noted, one application for the apparatus of this invention occurs in the drilling of oil wells. It is customary to suspend a drill pipe in the well bore with a bit on the lower end thereof and as the bit is rotated, to circulate a drilling fluid, such as a drilling mud, down through the interior of the drill string, out through the bit, and up the annulus of the well bore to the surface. The circulation of fluid is maintained for the purpose of removing cuttings from the well bore, for cooling the bit and for maintaining hydrostatic pressure in the well bore to control formation gases and prevent blowouts and the like. In those cases where the weight of the drilling mud is not sufficient to contain the bottom hole pressure in the well, it becomes necessary to apply additional back pressure on the drilling mud at the surface to compensate for the lack of hydrostatic head and thereby keep the well under control. It is for this purpose that a back pressure control choke of the present invention would be introduced into the return flow line for the drilling fluid.

In accordance with this invention, back pressure is maintained on the fluid in the return line by the action of an annular choke element 38 relative to annular choke seat 50. Choke element 38 is attached to a shuttle 28 which slideably moves within axial bore 16 upon fixed mandrel 26. The opening between inlet channel 14 and discharge channel 18 is controlled by movement of the choke element 38 toward and into choke seat 50. When choke element 38 is in its maximum open position, the "throttling" area, that is the passage area from the inlet channel to the discharge channel, is equal to the area of the discharge channel. Reduction of the "throttling" area is achieved by movement of the choke element 38 toward the choke seat 50, which action creates a back pressure on the fluid in the inlet channel and back through the well bore. Inasmuch as the characteristics of the drilling fluid (such as the circulating rate, density, or temperature) do not remain constant, the ability to maintain a constant back pressure on the drilling fluid, and consequently a constant bottom hole well pressure, requires a throttling action by the choke element. The arrangement of the present invention causes the shuttle 28 to respond automatically to changed flow characteristics in the drilling fluid such that the choke element 38 is moved relative to choke seat 50 to maintain a constant back pressure.

Referring again to FIG. 1, housing 12 may be provided with an end plate 20 secured to the main housing by bolts 22. Mandrel 26 is fixed to end plate 20 and extends therethrough into axial bore 16. End plate 20 may be provided with annular seal grooves 21 and 23 and O-ring seals 25 and 27 respectively, thereby sealing the end plate against the mandrel and housing.

Mandrel 26 has a shuttle 28 mounted thereon within the axial bore. Shuttle 28 is an annular element, concentric with mandrel 26 and axial bore 16. The shuttle has an enlarged diameter toward its rear end which contains an annular groove 29 for carrying a "T" ring seal 31. The enlarged portion of the shuttle diameter also has a recessed surface area 33 on its forward side which further includes an annular groove 35. Abutting the recessed surface area 33 of the shuttle is channel ring 39 which carries O-ring 41. Channel ring 39 is secured in place by lock ring 43 fitted into annular groove 35. As will be described in more detail hereafter, "T" ring seal 31 is the primary seal separating a closed chamber 37 at one end of the shuttle and the well pressured drilling fluid at the other, while O-ring 41 serves as a wiper ring. Shuttle 28 is also dynamically sealed against the mandrel 26 by "T" ring seal 65.

The closed chamber 37 is formed by the rear surface of shuttle 28, housing 12, mandrel 26, and the inside surface of end plate 20. Control fluid ports 24 are provided in end plate 20 as a means for injecting fluid into closed chamber 37 at a desired pressure level.

Arranged against the internal cylindrical surface area of the forward end of annular shuttle 28, and extending beyond the forward end of the shuttle, is annular choke element 38. An O-ring seal 45 is carried in annular groove 47, as a seal between the shuttle and choke element. A lock ring 40 is engaged in groove 49 of the choke element, which groove is located at the longitudinal midpoint of the choke element. A forward recess area 51 of the shuttle 28 threadably receives retainer 46 which acts to secure bolster ring 44, wedge seal 42, seal flange 53, and snap ring 40, and consequently choke element 38, against the shuttle 28. Accordingly, as the shuttle 28 is moved to the left as shown in FIG. 1, flow of fluid from inlet channel 14 to discharge channel 18 is restricted until fluid flow is completely stopped when choke element 38 is moved to the position shown in FIG. 2.

As will be noted from FIG. 1, the axial bore to the left of the intersection of the inlet channel has a counterbore 55. Positioned within this counterbore are annular throat liners 57, with the liner situated closest to the inlet channel serving as the choke seat 50. The throat liners 57 may be identical in size and configuration with choke seat 50 such that these elements could be interchangeable.

Choke seat 50, and throat liners 57, have an enlarged outside diameter about their midsection such that recessed areas 59 exist on the outside diameter at the ends of the choke seat and liners. Choke seat 50 abuts against throat liners 57 and these elements are retained in counterbore 55 by retainer ring 54 and snap ring 61. The choke seat 50 is sealed against the housing 12 by O-ring seal 52 which is carried in housing groove 62.

Choke seat 50 and throat liners 57 are preferably made of relatively hard material, or coated therewith, as for example, a coating of tungsten carbide or the like.

As depicted in the drawings, annular choke seat 50 has an inside cylindrical opening sized to admit or receive annular choke element 38 with minimal gap therebetween permitting insertion and removal of choke element 38 without contact or friction between their surface areas.

In the preferred embodiment of the present invention, a means is provided for indicating the position of choke element 38 relative to choke seat 50 and this can conveniently take the form of an elongated position rod 56 which is arranged to slideably extend through an axial bore in mandrel 26. The axial bore of the mandrel may be provided with appropriate packing 64 to provide a fluid tight seal with rod 56 and yet permit the rod to extend outside of housing 12, as shown in FIG. 1. The left end of rod 56 is connected to shuttle 28 by means of spider 60 mounted on the end of rod 56, as shown. The outer radial ends of spider 60 are arranged for engagement in appropriate notches provided in the internal bore of shuttle 28. Hence, upon movement of shuttle 28 in either axial direction, rod 56 will move therewith. By monitoring the right end of rod 56 which extends from housing 12, a determination can be made not only as to the relative position of choke element 38 with respect to choke seat 50, but also of the wear on the choke element and choke seat.

Shuttle 28 is what may be operationally described as a fluid balanced member. That is to say, the total surface area of the right axial end of shuttle 28 is substantially equal to the left axial end surfaces which are subjected to the high pressure fluid which is present upstream from choke seat 50. Hence, shuttle 28 will translate axially back and forth over mandrel 26 to balance pressures on each side thereof. For purposes of balance, the retainer 46, bolster ring 44 and wedge seal 42 form a part of the left (forward) axial end surface of the shuttle 28 and do not alter the "balance" of surface area exposed to fluid pressure. In addition, shuttle 28 and choke element 38 are substantially balanced on the downstream or a low pressure side, except for the surface area equal to the cross sectional area of rod 56.

In the normal operation of controlling back pressure on a fluid, such as in a well, the range of pressures on the low pressure side of the choke 38 or downstream from choke seat 50 will be on the order of 0 to 50 PSI. The pressure on the upstream portion of the choke or the high pressure side will be on the order of 0 to 10,000 PSI. Hence, the relative imbalance caused by the cross sectional surface area of rod 56 will be substantially inconsequential with result that shuttle 28 may be described as a substantially balanced shuttle. Therefore, any fluid pressure applied to closed chamber 37 will cause shuttle 28 and choke element 38 to move to the left, thereby restricting the flow of fluid through housing 12 until a pressure of equal magnitude is present in inlet channel 14 and acting upon shuttle 28.

Inasmuch as the shuttle 28 is directly exposed to the drilling fluid passing through the housing, it will respond directly and automatically to any changes in flow characteristics of the drill fluid which would result in an altered back pressure. There is no requirement for the detection of a changed flow condition and subsequent generation of a signal to a throttling device. The response in the present invention is automatic in terms of time and the lack of a need for an external control in "reply" to the need for throttling action. For example, where the density of the drilling fluid suddenly changes, as where a "gas slug" or debris pass through the housing causing a sudden drop or rise in pressure, the shuttle will immediately respond by moving to the left or to the right to achieve a back pressure on the drilling fluid which is in equilibrium with the pressure existing in the closed chamber 37.

Figure 2:
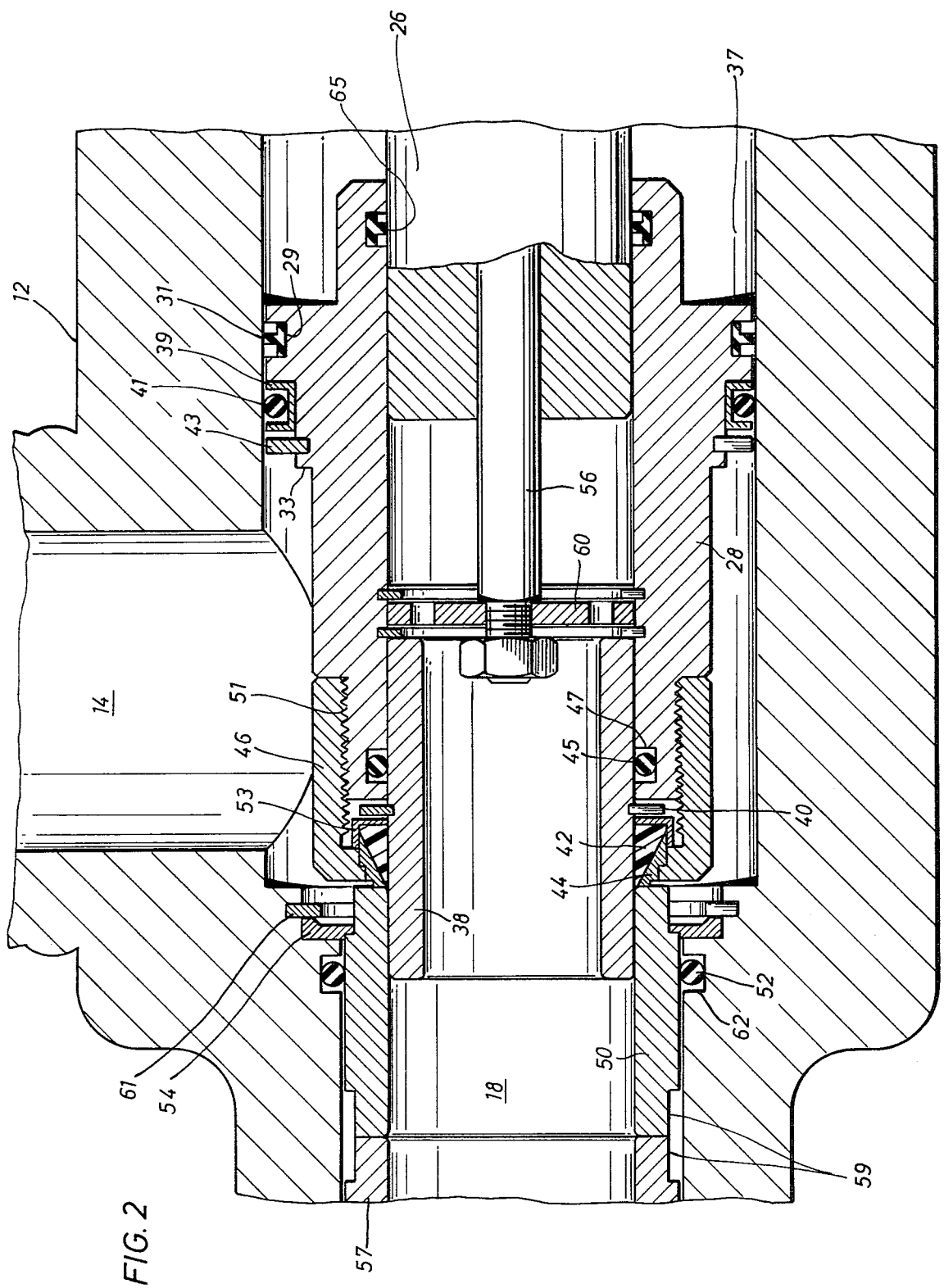

In those situations where a significant pressure drop occurs in inlet channel 14, or where a shut down of the circulation of the drilling fluid is desired, the apparatus of this invention achieves a positive cut-off of all flow. Referring to FIG. 2, a complete closure of the choke of this invention is depicted. Choke element 38 is inserted within choke seat 50 until the leading edge of choke seat 50 contacts and seals against wedge seal 42.

In the preferred embodiment, wedge seal 42 is a generally triangularly shaped Teflon seal. This arrangement does not interfere with the throttling of the choke and will withstand severe pressures and fluid velocities therethrough. Furthermore, this arrangement permits a positive shut in without the disadvantage of a significant friction factor working against the automatic reopening of the choke, which condition may create momentary excessive back pressures and cause damage to the well operation.

Deformation of the wedge seal 42 during a positive shut in is minimized by providing a seal flange 53 and bolster ring 44 which substantially encase the seal between choke element 38 and retainer 46. Sealing is achieved by the contact of the forward edge of choke seat 50 against the lower exposed portion of the "hypotenuse" side of wedge seal 42. Once a seal is achieved, this arrangement requires only approximately 6 PSI to break the seal. In view of the pressure being carried or exerted on the drilling fluid in the inlet channel 14, this "break out" pressure of 6 PSI is insignificant and permits the choke of this invention to remain very accurate in maintaining a desired back pressure on the drilling fluid. The wedge-shaped geometry of seal 42 also increases the efficiency of the seal wherein the choke seat 50 will continue to achieve a positive, fluid tight shut in. Furthermore, use of Teflon for the wedge seal makes the seal "self-energizing" in that it will extrude as necessary between choke element 38 and bolster ring 44 to provide a sealing surface for contact with choke seat 50.

The means for applying fluid pressure (not shown in the drawing) to closed chamber 37 will be apparent to those skilled in this art. For example, a hydraulic system, or a gas system utilizing a regulated gas supply could be utilized to communicate with control fluid ports 24 to thereby introduce and maintain the desired pressure to closed chamber 37.

Additional efficiency and economy is achieved in the preferred embodiment of this invention by constructing choke element 38 and choke seat 50 symmetrically such that they may be reversed end-by-end respectively when their first ends have become too worn. Furthermore, the edges of choke element 38 and choke seat 50 may be chamfered to reduce stresses at those points caused by the high pressure fluid passing thereby.

As previously described, T ring seal 31 serves as the primary seal between closed chamber 37 and the drilling fluid passing through the choke of this invention. O-ring 41 serves as a wiper ring to remove abrasive particles of the drilling fluid from the inside cylindrical surface of the housing which the T ring seal 31 also contacts, thereby serving as a means of protecting T ring seal 31 from abrasive wear.

In the preferred embodiment, channel ring 39, which carries O-ring 41, slides with shuttle 28 and is mounted thereon with a loose fit. Channel ring 39 is not as wide as the space provided for it on recessed surface area 33 behind lock ring 43, and therefore is allowed to slip back and forth approximately 0.015 inches to 0.025 inches. As the shuttle slides left to right and right to left, the O-ring 41 does also, but not quite as much due to the 0.015 to 0.025 inch "deadband" slip area. The inside diameter of channel ring 39 is also grooved axially to provide fluid communication between its left and right sides.

The deadband space permits the shuttle 28 to oscillate within that space without necessitating the breaking of the static friction of the O-ring 41 against the housing. This arrangement permits more precise trottling control with less friction drag from the O-ring 41. The deadband action also causes a pumping action in the cavity created between T ring seal 31 and O-ring 41, thereby assuring no pressure buildup between the seals and the evacuation of any contaminated mud or abrasive particles from this cavity.

The foregoing description of the invention has been directed in primary part to a particular preferred embodiment in accordance with the requirements of the Patent Statutes and for purposes of explanation and illustration. It will be apparent, however, to those skilled in this art that many modifications and changes in this specific apparatus may be made without departing from the scope and spirit of the invention. For example, equivalent elements or materials may be substituted for those illustrated and described herein, parts may be reversed, and certain features of the invention may be utilized independently of the use of other features. It is applicants intention in the following claims to cover such modifications and variations as fall within the true spirit and scope of the invention.

What is claimed is:

1. A back pressure control choke comprising:
   a housing having an inlet channel intersecting with an axial bore, with one end of the axial bore defining a discharge channel for fluid passing through the choke;

a choke seat member concentrically mounted within the axial bore between the inlet channel and the discharge channel, the choke seat member having a generally cylindrical internal surface;

a mandrel, fixed to the housing, coaxially extending into the axial bore in that portion of the axial bore opposite the discharge channel;

a shuttle, slideably mounted on the mandrel within the axial bore, the surface area of the forward axial end of the shuttle facing the discharge channel being substantially equal to the surface area of the rear axial end of the shuttle;

a first dynamic seal means between the shuttle and the axial bore of the housing;

a second dynamic seal means between the shuttle and the mandrel such that a closed chamber is formed within the axial bore by the rear of the shuttle, mandrel and housing;

a choke element mounted to the forward end of the shuttle, cylindrically shaped and concentric with the axial bore, the choke element having a predetermined size permitting insertion and withdrawal from the choke seat member; and a means for applying fluid pressure to the closed chamber and the rear axial end of the shuttle, thereby controlling the movement of the shuttle and choke element relative to the choke seat member and the back pressure exerted on the fluid passing through the choke.

2. The back pressure control choke of claim 1, further comprising a seal means carried by the shuttle and choke element for sealing between the choke seat member and choke element when the choke element is fully inserted into the choke seat member.

3. The back pressure control choke of claim 2, wherein the seal means comprises a triangularly shaped seal abutted and retained against the shuttle and choke element in a manner that when substantially complete insertion of the choke element into the choke seat member occurs, the leading edge of the choke seat member will contact the seal and stop the flow of fluid through the choke.

4. The back pressure control choke of claim 3, wherein the triangularly shaped seal is made of Teflon.

5. The back pressure control choke of claim 2, wherein the seal means comprises a seal of extrudable material abutted and retained against the shuttle and choke element in a manner that when substantially complete insertion of the choke element into the choke seat member occurs the seal will be in sealing contact with the choke seat member.

6. The back pressure control choke of claim 1, wherein the first dynamic seal means is comprised of
a T ring seal mounted in a groove about the outside circumference of the shuttle;
a channel ring mounted about the outside circumference of the shuttle between the T ring seal and the fluid flowing through the control choke; and
a wiper ring mounted in the channel ring.

7. The back pressure control choke of claim 6, wherein the channel ring has axial grooves on its inside diameter to permit fluid communication between its right and left sides and is mounted about the shuttle in a space of a width greater than the channel ring.

8. The back pressure control choke of claim 1, wherein the choke element is reversible.

9. The back pressure control choke of claim 1, wherein the choke seat member is reversible.

10. The back pressure control choke of claim 1, wherein the choke element and choke seat member have chamfered edges.

11. The back pressure control choke of claim 1, further comprising a rod slideably extending through the mandrel, with one end extending outside the housing and the other end having means for connecting to the shuttle for axial movement therewith, whereby the position of the outward end of the rod is indicative of the position of the shuttle and choke element in the housing.

12. A back pressure control choke, for controlling back pressure of fluid flowing through the control choke, comprising:

a housing having an inlet channel intersecting with an axial bore, with one end of the axial bore defining a discharge channel for fluid passing through the choke;

an annular choke seat member concentrically mounted within the axial bore between the inlet channel and the discharge channel, the choke seat member having a generally cylindrical internal surface;

a mandrel, fixed to the housing, coaxially extending into the axial bore in that portion of the axial bore opposite the discharge channel;

an annular shuttle, slideably mounted on the mandrel within the axial bore, the surface area of the forward axial end of the shuttle facing the discharge channel being substantially equal to the surface area of the rear axial end of the shuttle;

a first dynamic seal means between the shuttle and the axial bore of the housing;

a second dynamic seal means between the shuttle and the mandrel such that a closed chamber is formed within the axial bore by the rear of the shuttle, mandrel and housing;

an annular choke element mounted to the forward end of the shuttle, cylindrically shaped and concentric with the axial bore, the annular choke element having a predetermined size permitting insertion and withdrawal from the annular choke seat member;

a triangularly shaped seal abutted and retained against the shuttle and annular choke element in a manner that when substantially complete insertion of the annular choke element into the annular choke seat occurs, the leading edge of the annular choke seat contacts the seal and stops the flow of fluid through the choke;

a rod slideably extending through the mandrel, with one end of the rod extending outside the housing and the other end having means for connecting to the shuttle for axial movement therewith, whereby the position of the outward end of the rod is indicative of the position of the shuttle and annular choke element in the housing; and a means for applying fluid pressure to the closed chamber and the rear axial end of the shuttle thereby controlling the movement of the shuttle and choke element relative to the choke seat member and the back pressure exerted on the fluid passing through the choke.

13. The back pressure control choke of claim 12, wherein the triangularly shaped material is made of Teflon.

14. The back pressure control choke of claim 12, wherein the triangularly shaped seal is made of an extrudable material.

15. The back pressure control choke of claim 12, wherein the first dynamic seal means is comprised of
 a T ring seal mounted in a groove about the outside circumference of the shuttle;
 a channel ring mounted about the outside circumference of the shuttle between the T ring seal and the fluid flowing through the control choke; and
 a wiper ring mounted in the channel ring.

16. The back pressure control choke of claim 15, wherein the channel ring has axial grooves on its inside diameter to permit fluid communication between its right and left sides and is mounted about the shuttle in a space of a width greater than the channel ring.

* * * * *